US012305728B2

(12) United States Patent
White et al.

(10) Patent No.: US 12,305,728 B2
(45) Date of Patent: May 20, 2025

(54) SLACK ADJUSTER ASSEMBLY FOR HEAVY-DUTY VEHICLES

(71) Applicant: Hendrickson USA, L.L.C., Schaumburg, IL (US)

(72) Inventors: Jay D. White, Lenoir, NC (US); David L. Schaeffer, Louisville, OH (US); Dhawal P. Dharaiya, Twinsburg, OH (US); Wyatt R. Weekley, Lincoln, NE (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 438 days.

(21) Appl. No.: 17/943,292

(22) Filed: Sep. 13, 2022

(65) Prior Publication Data

US 2023/0088211 A1 Mar. 23, 2023

Related U.S. Application Data

(60) Provisional application No. 63/246,829, filed on Sep. 22, 2021.

(51) Int. Cl.
*F16D 65/54* (2006.01)
*F16D 125/30* (2012.01)

(52) U.S. Cl.
CPC ........ F16D 65/546 (2013.01); *F16D 2125/30* (2013.01)

(58) Field of Classification Search
CPC .......... B60T 17/22; F16D 51/22; F16D 65/22; F16D 65/38; F16D 65/60; F16D 65/546; F16D 66/00; F16D 66/025; F16D 66/027; F16D 2066/003; F16D 2066/005; F16D 2125/30; F16D 2125/32

USPC ...................................................... 188/79.63
See application file for complete search history.

(56) References Cited

U.S. PATENT DOCUMENTS

| 3,076,531 | A | | 2/1963 | Hanley et al. |
| 3,497,037 | A | | 2/1970 | Deibel |
| 3,997,036 | A | | 12/1976 | Zeidler |
| 4,114,733 | A | | 9/1978 | Knight |
| 4,343,561 | A | * | 8/1982 | Campanini ............ F16D 65/60 |
| | | | | 188/79.55 |
| 4,380,276 | A | | 4/1983 | Sweet et al. |

(Continued)

FOREIGN PATENT DOCUMENTS

| WO | 1998016757 | 4/1998 |
| WO | WO-2010003244 A1 * | 1/2010 ............ B60T 17/088 |
| WO | 2014150551 | 9/2014 |

*Primary Examiner* — Robert A. Siconolfi
*Assistant Examiner* — San M Aung
(74) *Attorney, Agent, or Firm* — Dureska & Moore, LLC; David P. Dureska; Benjamin J. Chojnacki

(57) ABSTRACT

A slack adjuster assembly for heavy-duty vehicles, the slack adjuster assembly comprising a slack adjuster and an inboard sealing assembly. The slack adjuster is disposed about and has an internal spline for receiving an external spline of an inboard end of a camshaft of a camshaft assembly of the heavy-duty vehicle. The internal spline has a radial clearance from the external spline. The inboard sealing assembly includes mechanical components that cooperate with the radial clearance to increase grease flow and distribution. The inboard sealing assembly is disposed over the inboard end of the camshaft and engages an inboard side of the slack adjuster to form a 360-degree seal about the inboard side.

19 Claims, 4 Drawing Sheets

(56) References Cited

U.S. PATENT DOCUMENTS

| | | | | |
|---|---|---|---|---|
| 4,491,203 A | * | 1/1985 | Monick | F16D 65/567 |
| | | | | 188/71.9 |
| 5,253,735 A | * | 10/1993 | Larson | F16D 66/025 |
| | | | | 324/207.2 |
| 5,339,069 A | * | 8/1994 | Penner | F16D 65/60 |
| | | | | 188/1.11 R |
| 5,350,043 A | | 9/1994 | Crewson et al. | |
| 6,240,806 B1 | | 6/2001 | Morris et al. | |
| 6,450,302 B1 | | 9/2002 | Lyons | |
| 2015/0377311 A1 | * | 12/2015 | Okuma | F16D 65/22 |
| | | | | 188/1.11 E |
| 2021/0010529 A1 | * | 1/2021 | Wehner | F16D 3/845 |

* cited by examiner

SLACK ADJUSTER ASSEMBLY FOR HEAVY-DUTY VEHICLES

CROSS-REFERENCE TO RELATED APPLICATION

This application claims the benefit of U.S. Provisional Patent Application No. 63/246,829, filed Sep. 22, 2021.

BACKGROUND OF THE INVENTION

Technical Field

The present invention relates generally to the art of braking systems for heavy-duty vehicles. In particular, the present invention relates to braking systems for heavy-duty vehicles utilizing drum brakes. More particularly, the present invention is directed to a slack adjuster assembly for use in heavy-duty vehicle drum braking systems that increases grease flow through the slack adjuster, relieves grease back pressure in the slack adjuster and/or cam tube, and provides a 360-degree seal about the inboard side of the slack adjuster, thereby reducing required maintenance and increasing the service-life of the slack adjuster.

Background Art

The use of braking systems on heavy-duty vehicles is well-known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include disc brake systems and drum brake systems.

Drum brake systems are generally incorporated into an axle/suspension system of the heavy-duty vehicle. Drum brake systems typically include a brake drum mounted on a wheel hub of a wheel end assembly rotatably mounted on an outboard end of an axle. The brake drum typically includes a pair of brake shoes housed within the brake drum. Each brake shoe has a sacrificial, high coefficient of friction brake lining that is mounted on a metal backing plate, or shoe table, and maintained in a radially-spaced relationship from the interior braking surface of the brake drum. An S-cam attached to the outboard end of a camshaft of a cam shaft assembly of the drum brake system engages a pair of rollers, each of which is connected to an end of a respective brake shoe.

Drum brake systems also include a prior art slack adjuster assembly. Prior art slack adjuster assemblies typically include a slack adjuster attached to the inboard splined end of the camshaft. The slack adjuster establishes a rotation reference point, such as a control arm operatively connected to the axle/suspension system, for an automatic adjustment mechanism, as is known. The automatic adjustment mechanism of the prior art slack adjuster assembly indexes the camshaft rotation from the rotation reference point in order to maintain a preset distance or clearance between the brake lining of the brake shoes and the interior braking surface of the brake drum, regulating the stroke and mechanical force necessary to slow or stop the heavy-duty vehicle.

During operation, when the drum brake system is actuated, compressed air is communicated from an air supply source, such as a compressor and/or air tank, through air conduits or lines to a brake chamber, as is known. The brake chamber converts the air pressure into mechanical force and moves a pushrod. The pushrod, in turn, moves the slack adjuster of the prior art slack adjuster assembly, which causes rotation of the camshaft and S-cam, forcing the brake linings against the interior braking surface of the brake drum, thereby creating friction and slowing or stopping the heavy-duty vehicle. The prior art slack adjuster assembly indexes the rotation of the camshaft when the drum brake system is actuated. When the drum brake system is no longer actuated, the camshaft, and thus the S-cam, rotate back, allowing the radially-spaced relationship between the brake lining and interior braking surface of the brake drums to be re-established. The slack adjuster rotates back to a new position based on the indexed rotation of the cam shaft, thereby maintaining the preset distance or clearance between the brake lining and the interior braking surface of the brake drum.

Prior art slack adjuster assemblies, while adequate for the intended purpose, have potential disadvantages, drawbacks, and limitations. For example, prior art slack adjuster assemblies are typically unsealed along the inboard side, exposing the splined interface between the slack adjuster and camshaft. As a result, moisture, corrosive agents, and/or debris can potentially infiltrate between the slack adjuster and camshaft, causing corrosion and rust-locking of the intermeshed spline teeth and/or other components, thereby increasing braking system maintenance and heavy-duty vehicle downtime. Prior art sealing structures, such as boots, faceplates, and the like, have not optimally addressed the problem on slack adjusters. In addition, when utilizing prior art slack adjuster assemblies with cam tube assemblies, injection of pressurized grease through the cam tube and intermeshed splines of the camshaft and slack adjuster may potentially damage prior art sealing structures and/or may potentially be restricted or inhibited, preventing full lubrication of the splines and potentially increasing the occurrence of corrosion and rust-locking.

Thus, there is a need in the art for an improved slack adjuster assembly that increases grease flow through the slack adjuster, relieves grease back pressure in the slack adjuster and/or cam tube to allow for improved lubrication of the splined connection between the camshaft and the slack adjuster, and provides a 360-degree seal about the inboard side of the slack adjuster to prevent infiltration of water, contaminants, and/or other debris, thereby increasing the maintenance interval and service-life of the slack adjuster and reducing heavy-duty vehicle down time.

SUMMARY OF THE INVENTION

Objectives of the present invention include providing a slack adjuster assembly that increases grease flow through the slack adjuster.

A further objective of the present invention is to provide a slack adjuster assembly that reduces back pressure of grease in the slack adjuster and/or cam tube.

Yet another objective of the present invention is to provide a slack adjuster assembly with a 360-degree seal on the inboard side of the slack adjuster.

These objectives and advantages are obtained by the slack adjuster assembly for heavy-duty vehicles, according to the present invention, the slack adjuster assembly comprising a slack adjuster and an inboard sealing assembly. The slack adjuster is disposed about and has an internal spline for receiving an external spline of an inboard end of a camshaft of a camshaft assembly of the heavy-duty vehicle. The internal spline has a radial clearance from the external spline, and the external spline has an axial length. A ratio of the length to the radial clearance is less than or equal to 40.

The inboard sealing assembly is disposed over the inboard end of the camshaft and engages an inboard side of the slack adjuster to form a 360-degree seal about the inboard side.

BRIEF DESCRIPTION OF THE SEVERAL VIEWS OF THE DRAWINGS

The exemplary embodiment of the present invention, illustrative of the best mode in which applicants have contemplated applying the principles, is set forth in the following description, shown in the drawings, and particularly and distinctly pointed out and set forth in the appended claims.

Similar reference characters refer to similar parts throughout.

DESCRIPTION OF THE PREFERRED EMBODIMENT

An exemplary embodiment slack adjuster assembly 280 (FIG. 1), according to the present invention may be incorporated into any drum braking system (not shown). In particular, slack adjuster assembly 280 may be incorporated into a drum braking system utilizing a cam shaft assembly (partially shown) with or without a cam tube (not shown). More particularly, slack adjuster assembly 280 may be mounted on a camshaft 286 of a cam shaft assembly of a drum braking system.

Figure 2:
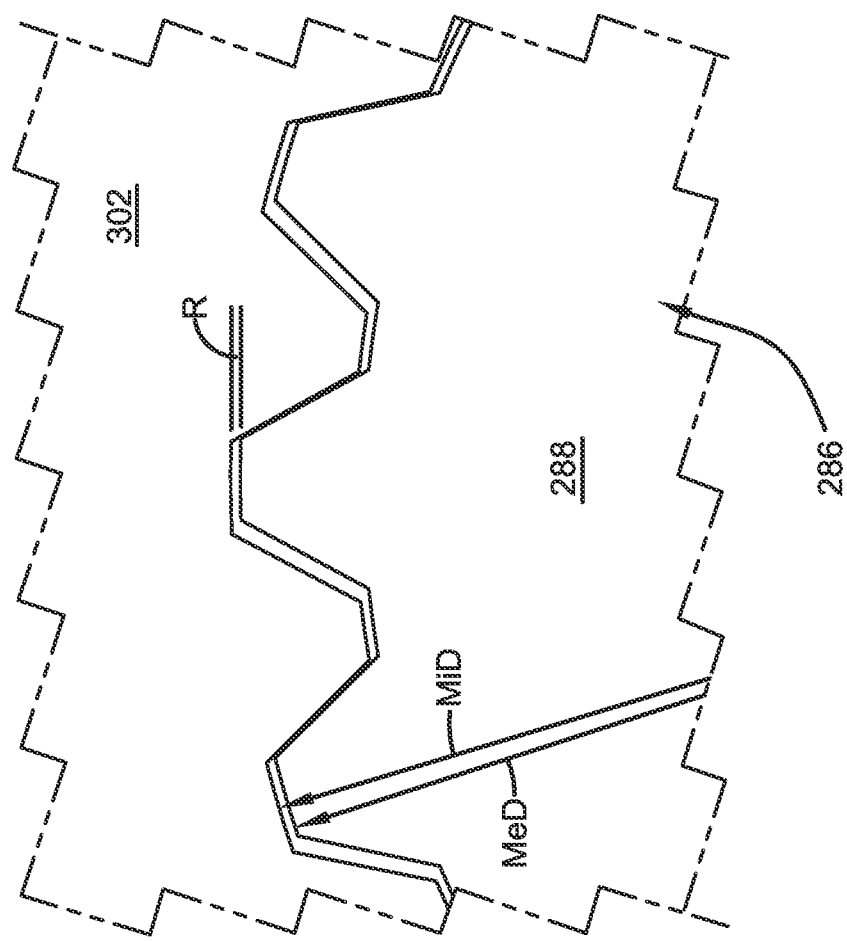
FIG. 2 is an enlarged fragmentary elevational view of the exemplary embodiment slack adjuster assembly shown in FIG. 1, showing the engagement of internal and external splines of the slack adjuster and camshaft, respectively.

Slack adjuster assembly 280 includes a slack adjuster 282 and an inboard sealing assembly 380. Slack adjuster 282 includes a body 300 having a female or internal spline 302 for receiving camshaft 286, as is known. More particularly, internal spline 302 mechanically engages a male or external spline 288 formed on an inboard end 284 of camshaft 286. Internal spline 302 is formed with an involute profile known in the art and generally meeting the ANSI B 92.1 requirement. In particular, internal spline 302 may be a 28-tooth, 20/40 pitch, 37.5-degree pressure axle spline. Alternatively, internal and external splines 302, 288, respectively, may be any other suitable spline, such as an SAE straight-sided 10-tooth spline, as is known. External spline 288 of camshaft 286 may include a major diameter or dimension MeD (FIG. 2) of about 1.45 inches, as is known.

In accordance with an important aspect of the present invention, internal spline 302 includes a modified root or major diameter or dimension MiD. In particular, material is removed from internal spline 302 radially outward of the ANSI B 92.1 standard major dimension MiD to increase the major dimension. Major dimension MiD of internal spline 302 may be in the range of from about 1.50 inches to about 1.53 inches, more preferably from about 1.51 inches to about 1.52 inches. It is also contemplated that, under certain conditions, major dimension MiD could be larger than 1.53. More particularly, the increase in major dimension MiD of internal spline 302 provides a relatively greater radial clearance R of about 0.030 inches between the internal spline and external spline 288 of camshaft 286, as compared to prior art internal and external splines that provide a radial clearance of only about 0.015 inches. Increasing major dimension MiD also provides a relatively decreased ratio of an axial length L of external spline 288 in inches to radial clearance R in inches. More particularly, increasing major diameter MiD allows internal and external splines 302, 288, respectively, to provide a relatively reduced ratio of axial length L of the external spline to radial clearance R of about 40 or less, more preferably of about 34 or less, as compared to prior art internal and external splines that provide a ratio of about 66.7. This reduced ratio allows for relatively increased flow and distribution of grease across the splined connection between internal and external splines 302, 288, respectively, of the respective slack adjuster assembly 280 and camshaft 286 as compared to prior art splined connections. As a result, internal and external splines, 302, 288, respectively, are better lubricated as compared to prior art slack adjuster assemblies and, thus, better resist corrosion, thereby allowing for reduced maintenance and increased service-life of slack adjuster assembly 280.

Figure 3:
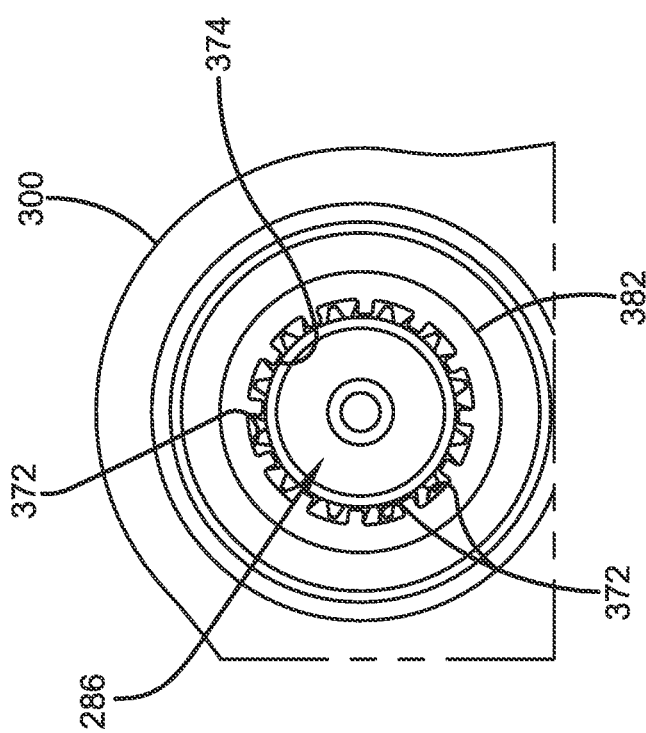
FIG. 3 is an enlarged fragmentary elevational view of the exemplary embodiment slack adjuster assembly shown in FIG. 1, showing washers of the inboard sealing assembly disposed about the inboard end of the camshaft.

Inboard sealing assembly 380 is sealingly engaged with the inboard side of slack adjuster 282. More specifically, inboard sealing assembly 380 may mechanically engage a coverplate (not shown) or body 300 of slack adjuster 282 on the inboard side of slack adjuster and form a seal to prevent ingress of water, chemicals, and/or debris into the slack adjuster. Inboard sealing assembly 380 includes one or more washers 382 (FIGS. 1 and 3), an E type snap ring or E-clip 384, a seal 390, and a cap or cover 386. Washers 382 may be disposed about the inboard end 284 of camshaft 286 inboardly of external spline 288 and outboardly of a groove 285 formed in the camshaft. In accordance with another important aspect of the present invention, washers 382 are formed or constructed with a plurality of circumferentially-spaced notches 372 formed adjacent to and merging with a central opening 374. More particularly, each one of notches 372 is formed with an arc length that is approximately 2 times greater than the arc length of opening 374 in contact with camshaft 286 adjacent the respective notch. More preferably the arc length of each of notches 372 is approximately 3 times the arc length of opening 374 in contact with camshaft 286 adjacent the respective notch. As a result, notches 372 provide increased flow and distribution of grease and facilitate grease passing through washers 382 without restriction even when the washers are utilized without aligning the notches of respective washers, thereby reducing grease back pressure.

Figure 1:
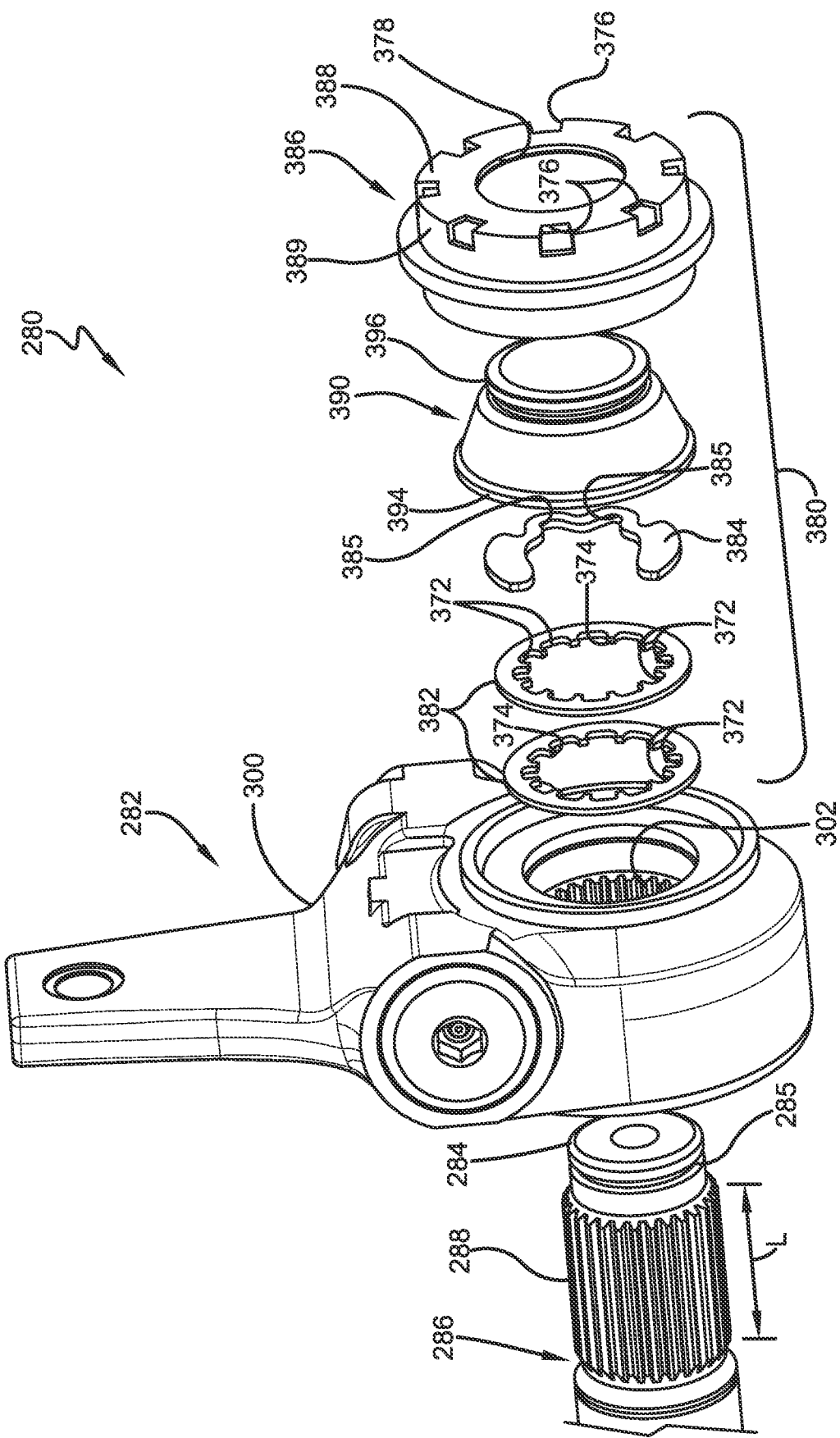
FIG. 1 is a fragmentary exploded view of an exemplary embodiment slack adjuster assembly, according to the present invention, showing an inboard end of the camshaft of the cam shaft assembly.
Figure 4:
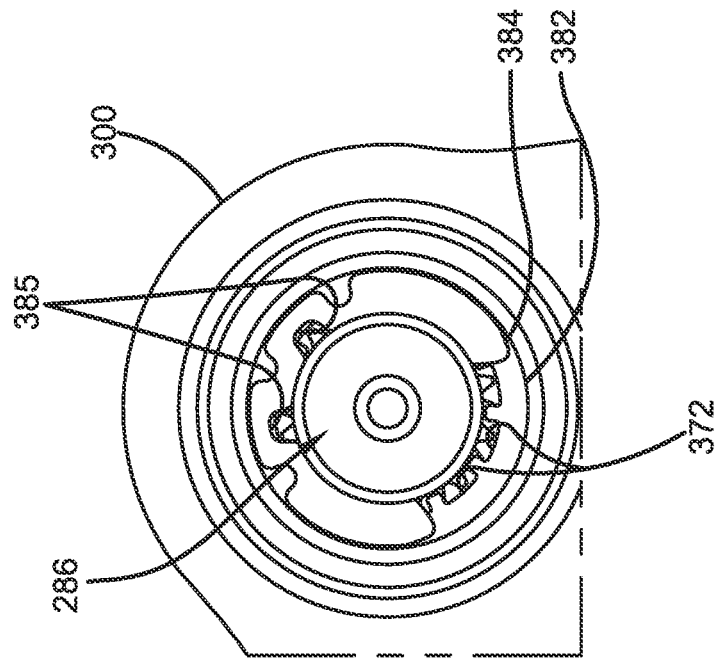
FIG. 4 is an enlarged fragmentary elevational view of the exemplary embodiment slack adjuster assembly shown in FIG. 1, showing an E-clip of the inboard sealing assembly disposed about the inboard end of the camshaft.

E-clip 384 of inboard sealing assembly 380 is snapped onto, or disposed about, inboard end 284 of camshaft 286 inboardly of washers 382 (FIGS. 1 and 4). More particularly, E-clip 384 mechanically engages inboard end 284 of camshaft 286 such that the E-clip is disposed within groove 285. E-clip 384 acts as a retaining ring to limit the amount of axial movement of washers 382, slack adjuster 282, and camshaft 286 in order to maintain the intermeshed relationship of internal and external splines 302, 288, respectively. E-clip 384 is formed such that it does not fully encircle camshaft 286, providing gaps 385 about the camshaft. Moreover, gaps 385 overlap with notches 372 of washers 382. As a result, notches 372 and gaps 385 cooperate to provide a relatively unrestricted path for grease, facilitating grease passing through washers 382 and increasing flow and distribution of grease across internal and external splines 302, 288, respectively, and reducing grease back pressure.

Figure 5:
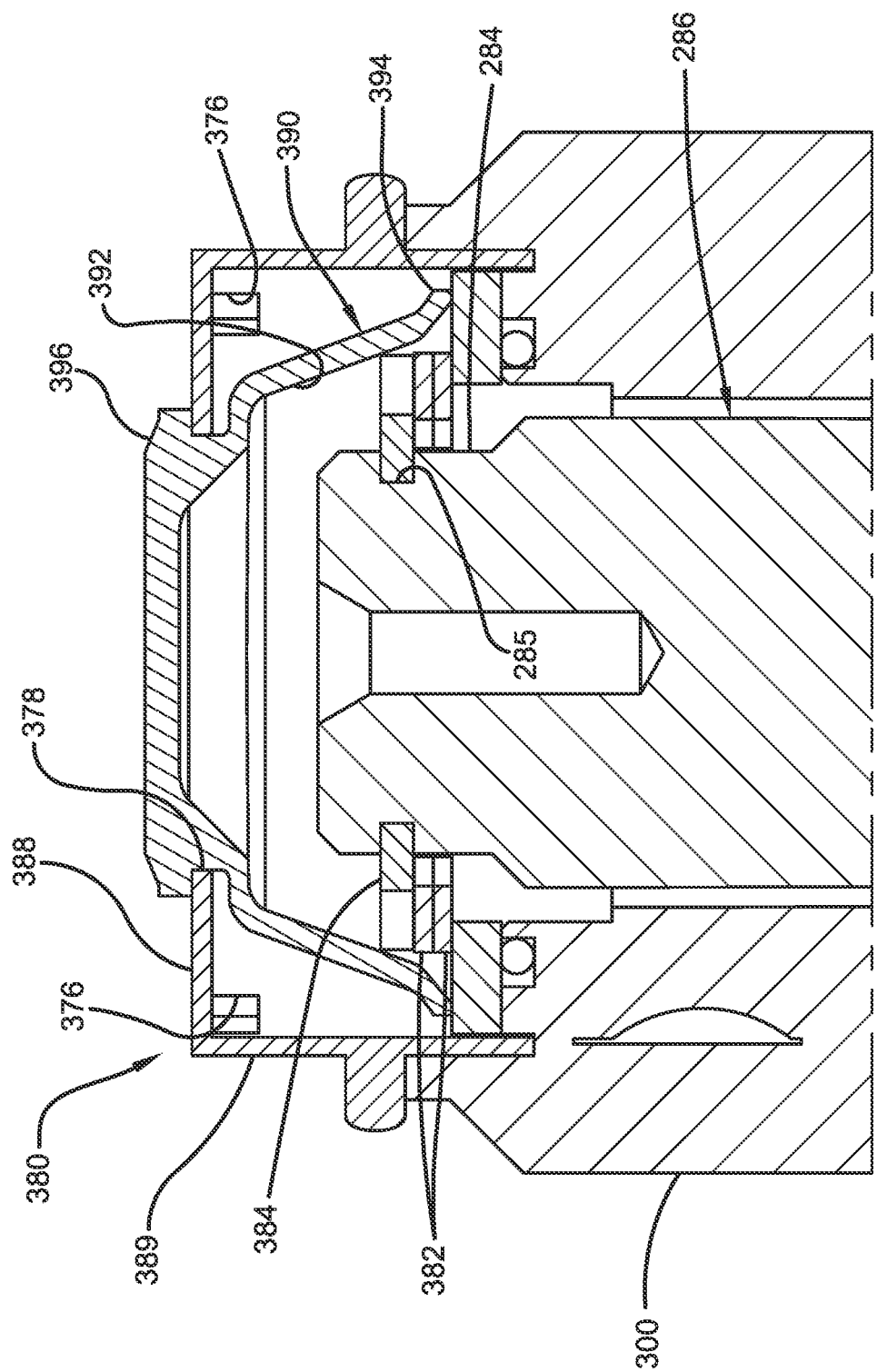
FIG. 5 is a fragmentary elevational view, in section, of the exemplary embodiment slack adjuster assembly shown in FIG. 1.

In accordance with another important aspect of the present invention, seal 390 of inboard sealing assembly 380 is disposed over inboard end 284 of camshaft 286 and forms an interface and/or is in contact with body 300 of slack adjuster 282 to form a 360-degree seal on the inboard side of the slack adjuster. In particular, seal 390 is formed from a flexible elastomeric material, such as rubber, as a generally bell- or cup-shaped structure including a recess or concavity 392 (FIG. 5) and a central inboardly-extending projection 396. More particularly, a large-diameter flap or lip 394 may be formed about the edge of concavity 392 and may form an interface and/or be in contact with a coverplate (not shown) or body 300 of slack adjuster 282 to create a 360-degree seal about the inboard side of the slack adjuster. As a result, pressurized grease may pool within concavity 392 as it flows through internal and external splines 302, 288, respectively; washers 382; and E-clip 384 to form a grease reservoir about and adjacent to components of slack adjuster assembly 280 to prevent wear and corrosion, thereby increasing the maintenance interval and service-life of slack adjuster assembly 280.

Furthermore, the large diameter of lip 394 combined with the flexible elastomer of seal 390 allows the lip to be displaced from concavity 392. More specifically, in the event grease overfills concavity 392, lip 394 may deflect radially outwardly and inboardly away from slack adjuster 282, allowing excess grease to be purged from the concavity. The bell- or cup-shape of seal 390 combined with the flexible elastomer material of the seal also prevents the seal from pulling a vacuum in concavity 392 or pressurizing the concavity in the event axial movement of camshaft 286 occurs during braking. More specifically, in the event axial movement of camshaft 286 occurs during braking, seal 390 may flex, compensating for any volume changes within concavity 392, thereby preventing suction of water, chemicals and/or other debris past lip 394 into the concavity. Similarly, flexion of seal 390 may also prevent unintentional purging of grease from concavity 392 potentially caused by axial movement of camshaft 286 increasing pressure within the concavity of the seal.

In accordance with yet another important aspect of the present invention, inboard sealing assembly 380 includes cover 386. Cover 386 may be formed from any suitable material, such as steel, plastic, or composite, using any suitable process, such as deep drawing, and include a plate or inboard face 388 integrally formed with a generally tubular, axially-extending sidewall 389. Cover 386 may be directly attached to the inboard side of slack adjuster 282. More specifically, at least a portion of sidewall 389 of cover 386 may form a threaded connection with a coverplate (not shown) or body 300 on the inboard side of slack adjuster 282. It is also contemplated that cover 386 may form any other suitable connection, such as press fit, interference fit, or snap fit, with a coverplate or body 300 on the inboard side of slack adjuster 282. Inboard face 388 may include a central opening 378 and a plurality of slots or vents 376 radially-spaced from and circumferentially arranged about the central opening and formed through the inboard face. More preferably, vents 376 may be formed through inboard face 388 and sidewall 389 along a radially outer edge or limit of the inboard face of cover 386. Alternatively, vents 376 may be formed through and circumferentially-spaced about inboard face 388 or sidewall 389 adjacent the radially outer edge of inboard face 388. Vents 376 are of any suitable size that is sufficient to provide protection to seal 390 from damage potentially caused by power washers, and the like, while also allowing the interior and exterior of cover 386 to be at atmospheric pressure. Maintaining the interior and exterior of cover 386 at atmospheric pressure allows air and/or grease to be purged from concavity 392 of seal 390 without creating back pressure. It is contemplated that grease purging past lip 394 of seal 390 may collect between the outside of the seal and within cover 386. Grease may also purge through vents 376, thereby serving as a visual indicator that radial clearance R between internal and external splines 302, 288, respectively; concavity 392; and at least a portion of cover 386 have been filled with grease. In addition, the arrangement of vents 376 about inboard face 388 and/or about sidewall 389 adjacent the radially outer edge of the inboard face allows water, chemicals, and/or debris to drain, preventing collection inside cover 386.

In accordance with an important aspect of the present invention, seal 390 may be connected to or engage with cover 386. More specifically, at least a portion of projection 396 may insert into or mechanically engage central opening 378 of inboard face 388 of cover 386. It is also contemplated that any other suitable method may be used to interconnect or engage seal 390 with cover 386. Engagement of seal 390 with cover 386 may facilitate control and adjustment of the contact pressure of lip 394 against the inboard side of slack adjuster 282. In particular, utilizing a threaded connection between cover 386 and slack adjuster 282 facilitates control of axial positioning of the outboard side of inboard face 388 of the cover relative to the slack adjuster. More particularly, because seal 390 is connected to or mechanically engages with inboard face 388 of cover 386, adjustment of the cover relative to slack adjuster 282 facilitates control of the positioning of lip 394 of the seal relative to the slack adjuster. As a result, the relative distance and contact pressure between lip 394 and the inboard side of slack adjuster 282 is independent of any axial movement of camshaft 286 that may potentially occur during braking, thereby ensuring a 360-degree seal is maintained.

Thus, slack adjuster assembly 280, according to the present invention, provides improved grease flow and distribution through internal and external splines 302, 288, respectively, of slack adjuster 282 and camshaft 286, respectively, by increasing the radial clearance R between the splines and utilizing an inboard sealing assembly 380 having washers 382 with notches 372 and E-clip 384 with gaps 385. In addition, inboard sealing assembly 380 provides a 360-degree seal on the inboard side of slack adjuster 282 utilizing bell- or cup-shaped seal 390 and cover 386 with vents 376 to allow for purging of grease from between internal and external splines 302, 288, respectively, while preventing the pulling of a vacuum or formation of back pressure in and about the seal, thereby allowing for improved lubrication of the splines, thereby increasing the maintenance interval and service-life of the slack adjuster and reducing heavy-duty vehicle down time.

It is contemplated that slack adjuster assembly 280 of the present invention could be formed from any suitable material, including but not limited to composites, metal, and the like, without changing the overall concept or operation of the present invention. It is also contemplated that slack adjuster assembly 280 of the present invention could be utilized in braking systems on heavy-duty vehicles having more than one axle and/or one or more than one wheel per wheel end assembly, without changing the overall concept or operation of the present invention. It is further contemplated that slack adjuster assembly 280 of the present invention could be utilized with all types of heavy-duty vehicle drum braking systems without changing the overall concept or operation of the present invention.

It is contemplated that different arrangements and materials of inboard sealing assembly 380 other than those shown and described, could be utilized without changing the overall concept or operation of the present invention, so long as they achieve a 360-degree seal on the inboard side of slack adjuster 282 that prevents grease back pressure and improves grease distribution through internal and external splines 302, 288, respectively. For example, opening 374 and notches 372 of washers 382 as well as gaps 385 and the inner diameter of E-clip 384 could have different configurations without changing the overall concept or operation of the present invention. Similarly, inboard sealing assembly 380, including seal 390 and cover 386, could have different configurations without changing the overall concept or operation of the present invention. It is also contemplated that any other style retaining ring that does not fully encircle camshaft 286, such as a C-clip style retaining ring, may be used in place of E-clip 384.

Accordingly, the exemplary embodiment slack adjuster assembly of the present invention is simplified; provides an effective, safe, inexpensive, and efficient structure and method, which achieves all the enumerated objectives; provides for eliminating difficulties encountered with prior art slack adjuster assemblies; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. The present invention has been described with reference to a specific embodiment. It is to be understood that this illustration is by way of example and not by way of limitation. Potential modifications and alterations will occur to others upon a reading and understanding of this disclosure, and it is understood that the invention includes all such modifications, alterations, and equivalents thereof.

Having now described the features, discoveries, and principles of the invention; the manner in which the slack adjuster assembly is used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A slack adjuster assembly for heavy-duty vehicles, said slack adjuster assembly comprising:
 a slack adjuster disposed about and having an internal spline for receiving an external spline of an inboard end of a camshaft of a camshaft assembly of the heavy-duty vehicle, said internal spline having a radial clearance from said external spline, the external spline having an axial length; and
 an inboard sealing assembly disposed over said inboard end of said camshaft and engaging an inboard side of said slack adjuster to form a 360-degree seal about said inboard side;
 wherein a ratio of said length to said radial clearance is less than or equal to 40, said ratio providing increased flow and distribution of grease between the internal spline and the external spline.

2. The slack adjuster assembly of claim 1, said internal spline having a major dimension of from about 1.50 inches to about 1.53 inches.

3. The slack adjuster of claim 1, said radial clearance being about 0.030 inches.

4. The slack adjuster assembly of claim 1, said inboard sealing assembly including at least one washer disposed about said camshaft inboardly of said slack adjuster;
 said washer including a central opening for receiving the camshaft and a plurality of notches formed radially outward from and circumferentially spaced about said central opening.

5. The slack adjuster assembly of claim 4, each of said plurality of notches having an arc length that is in the range of from about 2 to 3 times greater than the arc length of said central opening between adjacent notches.

6. The slack adjuster assembly of claim 4, said inboard sealing assembly further comprising a snap ring disposed inboardly of said at least one washer and engaging and at least partially encircling said camshaft;
 said snap ring being formed with at least one gap radially between the snap ring and the camshaft.

7. The slack adjuster assembly of claim 6, said snap ring being disposed within a groove formed into an outer surface of said camshaft.

8. The slack adjuster assembly of claim 1, said inboard sealing assembly further comprising a flexible seal forming a concavity with a lip about the outboard edge of said concavity and an inboardly extending projection;
 wherein said concavity is disposed adjacent said inboard side of said slack adjuster such that said lip is in contact with the inboard side of the slack adjuster and said inboard end of said camshaft at least partially projects axially into said concavity.

9. The slack adjuster assembly of claim 8, said inboard sealing assembly further comprising a cover, said cover including an inboard face and a cylindrical sidewall extending outboardly from said inboard face, the cover forming a threaded connection with said inboard side of said slack adjuster.

10. The slack adjuster assembly of claim 9, said inboard face being formed with an opening, said opening receiving and engaging with said projection of said seal, the seal being completely disposed within said cover;
 wherein rotation of said threaded connection adjusts the amount of contact between said lip of the seal and said inboard face of said slack adjuster.

11. The slack adjuster assembly of claim 10, said cover further comprising at least one vent opening, said at least one vent opening preventing damage to said seal and allowing the interior and exterior of the cover to be at atmospheric pressure.

12. The slack adjuster assembly of claim 11, said inboard sealing assembly providing a grease reservoir within said concavity of said seal.

13. A slack adjuster assembly for heavy-duty vehicles, said slack adjuster assembly comprising:
 a slack adjuster disposed about and having an internal spline for receiving an external spline of an inboard end of a camshaft of a camshaft assembly of the heavy-duty vehicle, said internal spline having a radial clearance from said external spline, the external spline having an axial length; and
 an inboard sealing assembly disposed over said inboard end of said camshaft and engaging an inboard side of said slack adjuster to form a 360-degree seal about said inboard side, said inboard sealing assembly including at least one washer disposed about said camshaft inboardly of said slack adjuster;

said washer including a central opening for receiving the camshaft and a plurality of notches formed radially outward from and circumferentially spaced about said central opening;

wherein a ratio of said axial length of the external spline to said radial clearance of the internal spline is less than or equal to 40.

14. The slack adjuster assembly of claim 13, each of said plurality of notches having an arc length that is in the range of from about 2 to 3 times greater than the arc length of said central opening between adjacent notches.

15. The slack adjuster assembly of claim 13, said inboard sealing assembly further comprising a snap ring disposed inboardly of said at least one washer and engaging and at least partially encircling said camshaft;

said snap ring being formed with at least one gap radially between the snap ring and the camshaft.

16. The slack adjuster assembly of claim 15, said snap ring being disposed within a groove formed into an outer surface of said camshaft.

17. A slack adjuster assembly for heavy-duty vehicles, said slack adjuster assembly comprising:

a slack adjuster disposed about and having an internal spline for receiving an external spline of an inboard end of a camshaft of a camshaft assembly of the heavy-duty vehicle, said internal spline having a radial clearance from said external spline, the external spline having an axial length;

wherein a ratio of said length to said radial clearance is less than or equal to 40; and an inboard sealing assembly disposed over said inboard end of said camshaft and engaging an inboard side of said slack adjuster to form a 360-degree seal about said inboard side, said inboard sealing assembly comprising:

a flexible seal forming a concavity with a lip about the outboard edge of said concavity and an inboardly extending projection, the concavity being disposed adjacent the inboard side of the slack adjuster such that said lip is in contact with the inboard side of the slack adjuster and the inboard end of said camshaft at least partially projects axially into the concavity; and a cover including an inboard face and a cylindrical sidewall extending outboardly from said inboard face, said cover forming a threaded connection with the inboard side of the slack adjuster, the inboard face being formed with an opening, said opening receiving and engaging with said projection of said seal, the seal being completely disposed within the cover;

wherein rotation of said threaded connection adjusts the amount of contact between the lip of the seal and the inboard face of the slack adjuster.

18. The slack adjuster assembly of claim 17, said cover further comprising at least one vent opening, said at least one vent opening preventing damage to said seal and allowing the interior and exterior of the cover to be at atmospheric pressure.

19. The slack adjuster assembly of claim 18, said inboard sealing assembly providing a grease reservoir within said concavity of said seal.

\* \* \* \* \*